No. 655,807. Patented Aug. 14, 1900.
F. P. STONE.
VEHICLE.
(Application filed Jan. 29, 1900.)
(No Model.) 2 Sheets—Sheet 1.
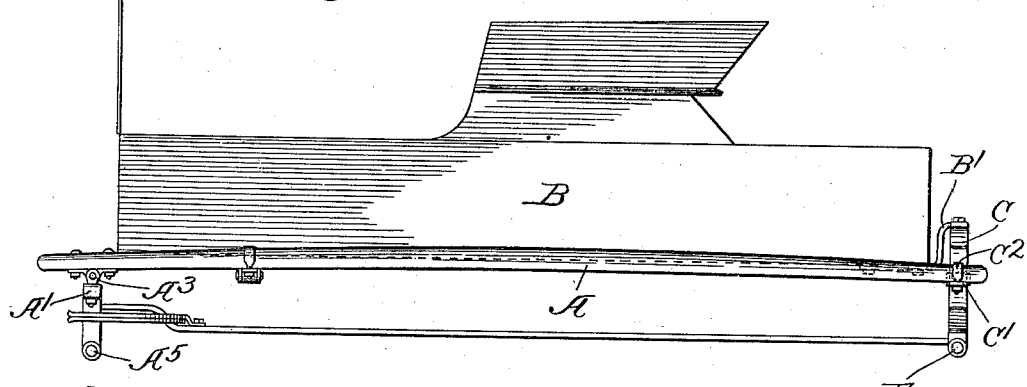
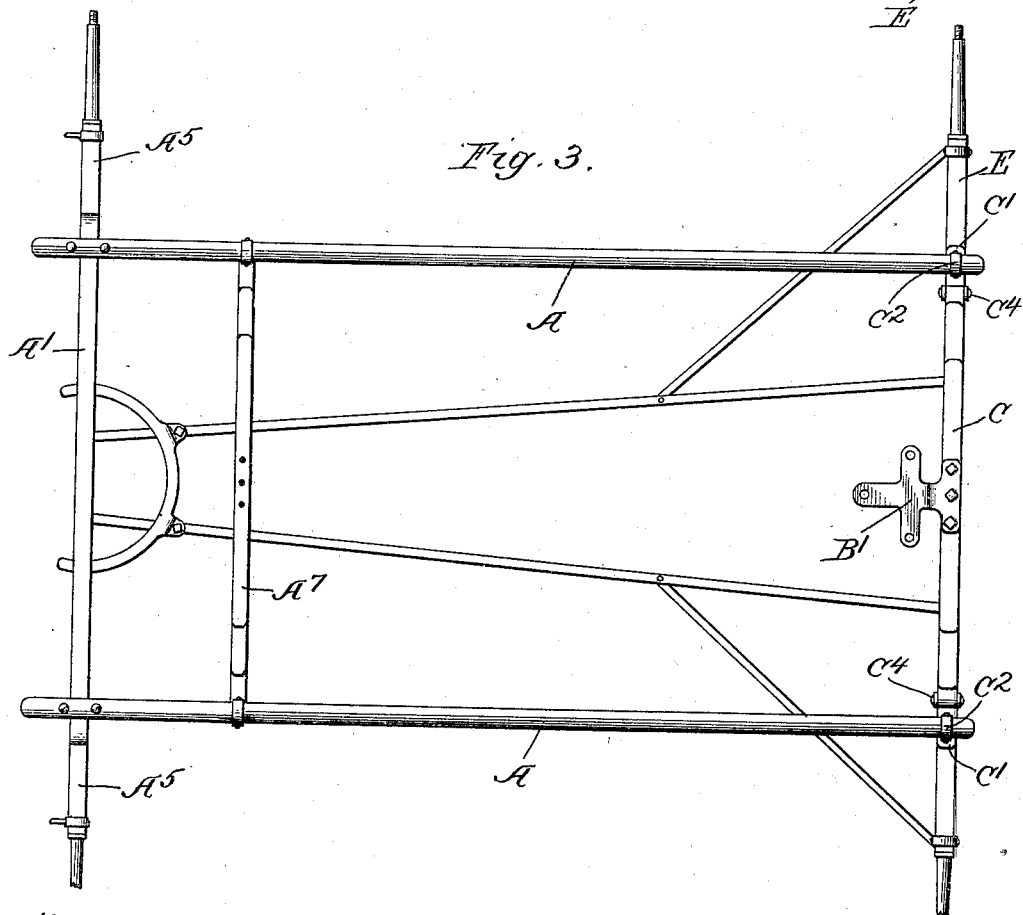
Witnesses.
Edward T. Wray.
E. P. Bitzer.
Inventor.
Frank P. Stone
by Parker & Carter
his Atty's.

No. 655,807. Patented Aug. 14, 1900.
F. P. STONE.
VEHICLE.
(Application filed Jan. 29, 1900.)
(No Model.) 2 Sheets—Sheet 2.
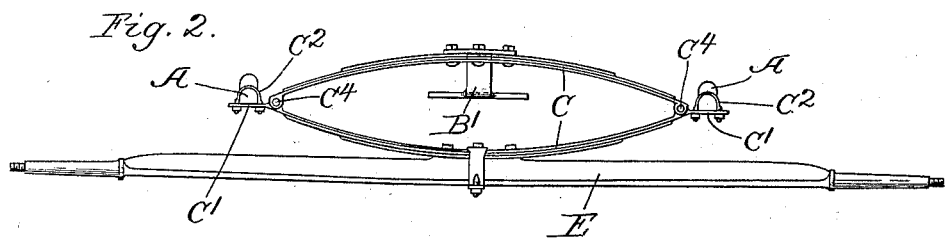
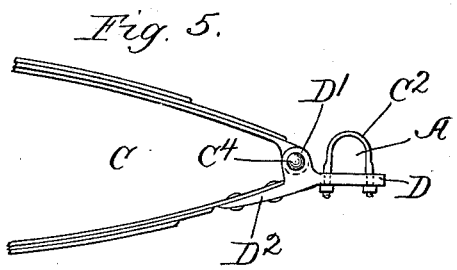
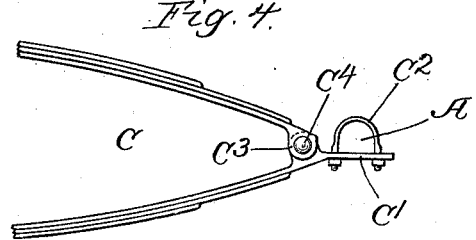
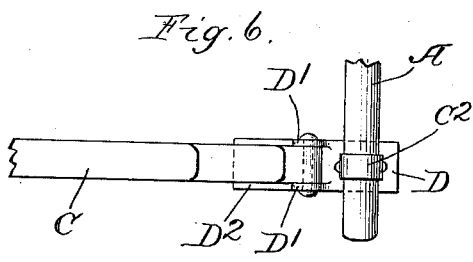
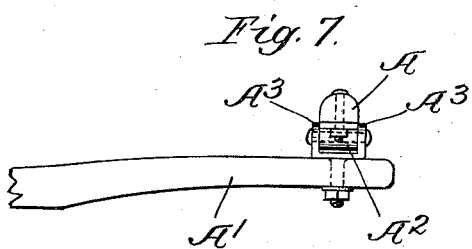
Witnesses
Edward T. Wray
E. P. Ritzer
Inventor
Frank P. Stone
by Parker & Carter
his Atty's

UNITED STATES PATENT OFFICE.

FRANK P. STONE, OF CHICAGO, ILLINOIS.

VEHICLE.

SPECIFICATION forming part of Letters Patent No. 655,807, dated August 14, 1900.

Application filed January 29, 1900. Serial No. 3,067. (No model.)

*To all whom it may concern:*

Be it known that I, FRANK P. STONE, a citizen of the United States, residing at Chicago, in the county of Cook and State of Illinois, have invented a certain new and useful Improvement in Vehicles, of which the following is a specification.

My invention relates to improvements in vehicles, and has for its object to provide a new and improved construction particularly adapted for carriages of the side-bar construction.

My invention is illustrated in the accompanying drawings, wherein—

Figure 1 is a side view of a vehicle embodying my invention with the wheels omitted. Fig. 2 is an end view of the device shown in Fig. 1 with the bed omitted. Fig. 3 is a plan view of the device shown in Fig. 2. Fig. 4 is an enlarged view showing the connection of the side-bars with the elliptical spring. Fig. 5 is a view similar to Fig. 4, showing a modified construction. Fig. 6 is a plan view of the device shown in Fig. 5. Fig. 7 is a view showing one construction for attaching the front ends of the side-bars to the part upon which they are supported.

Like letters refer to like parts throughout the several figures.

My invention is particularly adapted for use in connection with vehicles in which it is desired to have easy riding combined with adaptability for high speeds. For easy-riding vehicles it is exceedingly desirable to have elliptical springs; but such a construction is not adaptable for high speeds for the reason that there is too much movement to the body of the vehicle. It has been found that this excess of movement has a tendency to disconcert the horse, as it were, and throw him out of his gait. It is therefore considered that easy riding and adaptability for high speeds are inconsistent with each other, and the vehicles for speeding purposes have been constructed so as to be unsatisfactory for riding purposes.

One of the objects of my invention is to provide a construction which shall combine the two features of adaptability for high speeds and easy riding.

I have shown in the drawings a side-bar construction embodying my invention. In this connection the side-bars A are connected at the front end to a part A', which may be a half or end side-bar spring supported upon the front axle $A^5$. The body B of the vehicle is supported on a half-spring $A^7$, located near the front end of the side-bars, and hence the front end has very little movement. Instead of using a front spring, A' may be rigid and may consist of a wooden bolster or the like. The side-bars A may be connected to A' in any desired manner, the connection preferably being a pivotal connection, so that the side-bars may move with relation thereto. I have shown such a construction in Fig. 7, wherein the side-bar is attached to the part A' by means of the bolt $A^2$, engaging the holding parts $A^3$. At the rear of the vehicle I provide an elliptical spring C, supported upon the rear axle E, the body B being directly connected to the top of the spring by the connecting-piece B'. The side-bars A are both connected to the rear spring C, so as to be supported thereby. Any desired construction for this purpose may be used. As shown in Fig. 4, the lower half of the rear spring is provided with the projecting ends C', upon which the side-bars A rest, said side-bars being held in position by the holding-piece $C^2$. This construction may be easily formed by providing the ends of the halves of the spring with interlocking lugs $C^3$, which are connected together by suitable bolts $C^4$.

In Fig. 5 I have shown a modified construction, wherein a piece D, separate from the spring, is provided with lugs D', by means of which it is connected to the end of the spring, said piece being provided with the inwardly-projecting part $D^2$, which engages the lower face of the spring, as shown. It will be seen that by this construction the body of the vehicle is connected to the rear spring, so as to get the movement of the entire spring, while the side-bars get the reduced movement due to the elasticity of half of the spring. It will further be noticed that the body is connected directly with the rear spring, there being no intervening bolster, as is ordinarily the case. This bolster of course can be used, if desired. It will further be noticed that this construction permits the use of straight side-bars, and thus allows the beauty and symmetrical outline to be retained without detracting from the speeding and riding qualities of the vehicle. When this construction is used and the seat is placed near the rear of the bed, it will be seen that the vehicle will be easy riding, and at the same time the front part of the bed will be so held against movement as so give the desired adaptability for high speeds.

I have shown for purposes of illustration a particular construction embodying my invention; but it is of course evident that the construction may be varied in many particulars, and I therefore do not limit myself to the construction shown.

I claim—

1. A vehicle, comprising a front and rear axle, an elliptical spring supported upon the rear axle, side-bars supported in a suitable manner upon the front axle and connected with said elliptical spring so as to receive the movement due to one-half of said spring, a vehicle-body connected with said elliptical spring so as to receive the movement due to the entire spring.

2. A vehicle, comprising a front and rear axle, an elliptical spring supported upon the rear axle, a vehicle-body supported upon said axles, a straight side-bar on each side of said vehicle-body, the front ends of said side-bars supported upon the front axle, the rear ends of said side-bars being connected directly to the elliptical spring.

3. A vehicle, comprising a front and rear axle, an elliptical spring supported upon the rear axle, a vehicle-body carried by said axles and supported at the rear upon the elliptical spring, two side-bars supported at their rear ends by said elliptical spring, the side-bars and vehicle-body being independently connected with said spring.

4. A vehicle, comprising a front and rear axle, a vehicle-body supported thereby, an elliptical spring carried by said rear axle, side-bars on each side of said vehicle-body, the rear ends of said side-bars being connected by a suitable connecting device with said elliptical spring and being substantially in line with said spring.

5. A vehicle, comprising a front and rear axle, an elliptical spring supported upon the rear axle, a vehicle-body carried by said axles, side-bars on each side of said vehicle-body pivotally connected with the front axle, a supporting device for each side-bar, by means of which it is connected with the elliptical spring, the ends of the side-bar projecting beyond the supporting device.

FRANK P. STONE.

Witnesses:
DONALD M. CARTER,
HOMER L. KRAFT.